United States Patent Office 2,877,233
Patented Mar. 10, 1959

2,877,233

1,2-DIPHENYL-4-(2',5'-ENDOMETHYLENE-CYCLO-HEXYLMETHYL)-3,5-DIOXO PYRAZOLIDINE

Helmut Teufel and Heinrich Scheffler, Biberach (Riss), Germany, assignors to Geigy Chemical Corporation, New York, N. Y., a corporation of Delaware No Drawing. Application March 18, 1957
Serial No. 646,568

Claims priority, application Switzerland March 26, 1956

1 Claim. (Cl. 260—310)

The present invention is concerned with new, therapeutically valuable 3.5-dioxo-pyrazolidines bicyclically substituted in the 4-position, as well as the salts thereof with inorganic and organic bases.

It has been found that 3.5-dioxo-pyrazolidines bicyclically substituted in the 4-position of the general Formula I

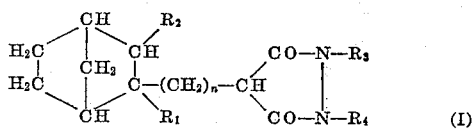

(I)

wherein $R_1$ and $R_2$ represent hydrogen or low molecular alkyl radicals, $n$ represents 0–3 and $R_3$ and $R_4$ represent hydrogen or alkyl, cycloalkyl, aralkyl, or aryl radicals, and in which any aromatic rings in $R_3$ and/or $R_4$ can also be substituted by low molecular alkyl, alkoxy, alkylmercapto radicals or halogen atoms, have valuable therapeutic properties, in particular, antipyretic, antiphlogistic and analgetic activity.

These new compounds can be produced principally by ring closing condensation of reactive functional derivatives of correspondingly substituted malonic acids with hydrazine, acyl hydrazines, substituted hydrazines, substituted acyl hydrazines as well as, possibly, metal compounds of substituted hydrazines. The production is thus characterised by condensing a substituted malonic acid ester of the general Formula II

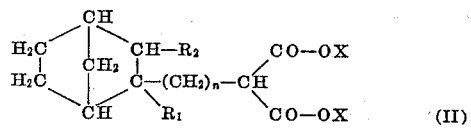

(II)

wherein X represents hydrocarbon radicals, in particular low molecular alkyl radicals, and $R_1$, $R_2$ and $n$ have the meanings given above, with hydrazine or with a hydrazine derivative of the general Formula III

(III)

or with an N-acyl derivative of such a hydrazine or hydrazine derivative having an acyl radical which can be easily split off, the condensation being performed preferably in the presence of an alkaline condensing agent, or by condensing a substituted malonic acid derivative of the general Formula IV:

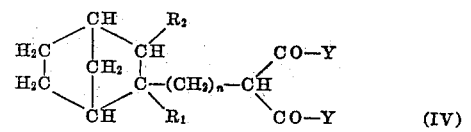

(IV)

wherein Y represents chlorine, bromine or an acyloxy radical, with hydrazine or with a hydrazine derivative of the general Formula III, the condensation being performed advantageously in the presence of an acid binding agent, or, if $R_3$ and $R_4$ represent aryl radicals it is possible to condense the malonic acid derivative with a metal compound of such a hydrazine, or by condensing a substituted cyanacetic acid ester of the general Formula V

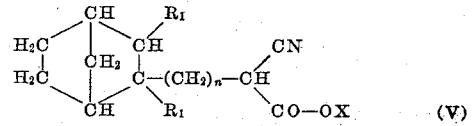

(V)

with hydrazine or a hydrazine derivative of the general Formula III in which, however, $R_4$ may not represent an aryl radical and then converting the substituted 3-imino-5-oxo-pyrazolidine or 3-amino-pyrazole-5-one obtained by hydrolysis into the correspondingly substituted 3.5-dioxo-pyrazolidine.

Alkali metals or compounds thereof such as alcoholates, amides, hydroxides or hydrides can be used as alkaline condensing agents for the first production process mentioned above. The condensation can be performed in the presence or absence of organic solvents, of which methanol, ethanol, propanol, butanol, benzene, toluene, xylene are examples, and it can be performed at a raised temperature, preferably between 80 and 160° C. If an alkali metal alcoholate is used as condensing agent, the reaction is performed advantageously in inert organic solvents such as toluene or xylene and the alcohol coming from the alcoholate as well as that liberated during the reaction is continuously distilled off, if necessary while replacing the solvent which also passes over.

In particular, tertiary organic bases such as pyridine or dimethyl aniline, triethyl and also tributyl amine are suitable as acid binding agents for the second reaction described. They are used in the presence or absence of additional organic solvents such as, e. g. diethyl or di-isopropyl ether. In this case, the ring is closed already at low temperatures, advantageously in the region of 0° C. In condensations with aliphatic, aralphatic or cycloaliphatic hydrazines, also an excess of the hydrazine used, i. e. 3 mols instead of one mol per mol of malonic acid derivative can be used as acid binding agent.

The condensation of substituted cyanacetic acid esters of the general Formula V with hydrazine or substituted hydrazines of the general Formula III can be performed in the warm for example by means of sodium alcoholate solutions. The 3-imino compounds obtained direct can be hydrolysed for example by heating with diluted mineral acids.

Instead of substituted malonic acid diesters or dihalides finally also substituted malonic acid monester derivatives of the general Formula VI

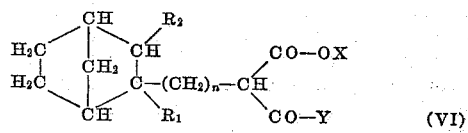

(VI)

can be as starting materials for the ring closing reaction. These are condensed in a first step corresponding to the second production process described above, the reaction being performed in the cold in the presence of an acid binding agent, with hydrazine or a hydrazine derivative of the general Formula III to form substituted malonic acid ester hydrazides of the general Formula VII

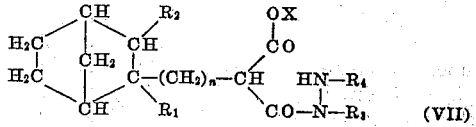

(VII)

and, in a second step corresponding to the first production process mentioned above, are converted in the warm by means of alkaline condensing agents into the desired end products of the general Formula I.

The substituted malonic acid diesters of the general Formula II necessary for the reaction can be produced for example by condensation of sodium malonic acid diesters with halogen compounds of the general Formula VIII:

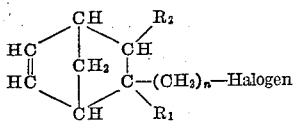

(VIII)

followed by hydrogenation. Alternatively, a bicyclic halide can first be hydrogenated and then condensed with malonic acid esters. The halogen compounds of the general Formula VIII can be produced by adding cyclopentadiene to unsaturated aliphatic halogen compounds such as, e. g. allyl chloride, methallyl chloride or vinyl bromide; see for example K. Alder and E. Windemuth, Berichte der Deutschen Chemischen Gesellschaft 71, 1939 (1939) ($n=1$) and J. D. Roberts et al., J. Am. Chem. Soc. 72, 3116 (1950) ($n=0$). In addition, bicyclically substituted malonic acid diesters of the general Formula II can be obtained by diene synthesis. Suitable unsaturated substituted malonic acid diesters which can be used as philodienes, such as, e. g. allyl malonic acid diethyl ester, are reacted with cyclopentadiene and the unsaturated esters obtained are then hydrogenated. The malonic acid dihalides are obtained from the esters by alkaline saponification, liberation of the acids and treatment thereof with inorganic acid halides such as thionyl chloride, phosphorus pentachloride or phosphorus tribromide.

Examples of substituted malonic acid esters of the general Formula II are (2.5-endomethylene-cyclohexyl)-malonic acid diethyl ester, (2.5-endomethylene-cyclohexyl-methyl)-, 1-(methyl-2.5-endomethylene-cylohexyl-methyl)-, (2.5 - endomethylene - 6 - methyl - cyclohexyl-methyl)-, β-(2.5-endomethylene-cyclohexyl)-ethyl- and γ-(2.5-endomethylene-cyclohexyl)-propyl- malonic acid diethyl esters.

Apart from hydrazine and N-acetyl hydrazine, examples of starting materials of the general Formula III are: methyl, ethyl, n-propyl, isopropyl, n-butyl, isobutyl, tertiary butyl, and allyl hydrazine; cyclohexyl, 3-methylcyclohexyl, and methyl hydrazine; benzyl, 3-chlorobenzyl, 4-chlorobenzyl, 4-methylbenzyl, 2.4-dimethylbenzyl, 3.4-dimethylbenzyl, 2-methoxybenzyl, 3-methoxybenzyl, 4-methoxybenzyl, α-methylbenzyl, β-phenylethyl, benzhydryl and α.β-diphenylethyl hydrazine; phenyl hydrazine, 2-chloro, 3-chloro, 4-chloro, 2.4-dichloro, 2.5-dichloro, 3.5-dichloro, 2.4.5-trichloro, 2-bromo, 3-bromo, 4-bromo, 2.4-dibromo, 2.5-dibromo, 3.4-dibromo, 2-methyl, 3-methyl, 4-methyl, 2.4-dimethyl, 2.5-dimethyl, 2.4.5-trimethyl, 4-ethyl, 4-tertiary butyl, 2-methyl-4-bromo, 2-bromo-4-methyl, 2-methoxy, 4-methoxy, 2-ethoxy, 4-ethoxy, 3-ethoxy-4-methyl, 3.4-methylenedioxy, 2-methylmercapto and 4-methylmercapto phenyl hydrazine, p-cyml hydrazine, p-diphenylyl hydrazine, α-naphthyl hydrazine, β-naphthyl hydrazine, 1-methyl-β-naphthyl hydrazine, 5.6.7.8-tetrahydronaphthyl-(2)-hydrazine; N.N'-dimethyl, N.N'-diethyl, N-methyl-N'-isopropyl, N.N'-di-isopropyl, N.N'-di-isobutyl, N.N'-di-n-heptyl and N.N'-di-n-octyl hydrazine; N-methyl-N'-cyclohexyl hydrazine; N-methyl-N'-benzyl hydrazine; N-methyl-N'-phenyl hydrazine, N-ethyl, N-isopropyl, N-(α-ethyl-propyl), N-n-heptyl and N-allyl-N'-phenyl hydrazine; N.N'-dicyclohexyl hydrazine, N.N'-bis-(2-methylcyclohexyl)-hydrazine, N.N'-bis-(4-methyl-cyclohexyl)-hydrazine, N.N'-bis-cyclohexylmethyl hydrazine, and N.N'-dibornyl hydrazine; N-cyclohexyl-N'-benzyl hydrazine; N-cyclohexyl-N'-phenyl hydrazine; N.N'-dibenzyl hydrazine, N.N'-bis-(3-chloro-benzyl)-hydrazine, N.N'-bis-(α-methylbenzyl)-hydrazine, N.N'-dibenzhydryl hydrazine; N-benzyl, N-(α-ethylbenzyl), N-(α-ethyl-4-methylbenzyl), N-(α-ethyl-4-methoxybenzyl) and N-benzyhydryl-N'-phenyl hydrazine; hydrazobenzene, 4-chloro, 2.2'-dichloro, 3.3'-dichloro, 4.4'-dichloro, 2.4-dichloro, 4-bromo, 2.2'-dibromo, 3.3'-dibromo, 4.4'-dibromo, 3.5-dibromo, 2-methyl, 3-methyl, 4-methyl, 2.2'-dimethyl, 3.3'-dimethyl, 4.4'-dimethyl, 4-methyl - 4' - chloro, 2.4 - dimethyl, 2.4.2'.4' - tetramethyl, 3.4.3'.4'-tetramethyl, 4.4'-bis-tert. butyl, 2-ethoxy, 3-ethoxy, 4-methoxy, 4-methoxy-4'-methyl, 4-ethoxy, 4-ethoxy-4'-bromo, 4-ethoxy-4'-methyl, 3.3'-diethoxy, 4.4'-diethoxy, 3.3'-bis-methylmercapto, 4.4'-bis-methylmercapto and 4.4'-bis-ethylmercapto hydrazobenzene. Most of these compounds are known. The N-acetyl derivatives thereof and other hydrazines substituted according to the definition can be produced in the manner described for the known compounds.

Whilst in the condensation comprised in the first process mentioned and the modifications thereof always compounds are obtained which contain the bicyclic radical in the 4-position, such a radical can be introduced into already existing 3.5-dioxo-pyrazolidines subsequently, by condensing such a compound of the general formula:

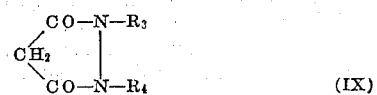

(IX)

with an aldehyde of the general formula:

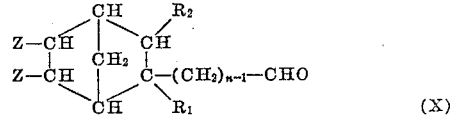

(X)

wherein both Z's each represent a hydrogen atom or together they represent an additional linkage, to form compounds of the general formula:

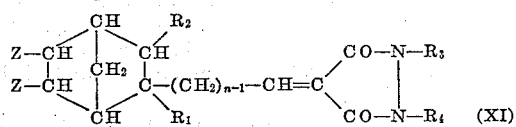

(XI)

and then reacting either simultaneously or subsequently with catalytically activated hydrogen, e. g. by means of noble metal catalysts or Raney nickel until one or two mols of hydrogen have been taken up, depending on the meaning of Z. In particular, the two compounds 2.5-endomethylene-Δ³-cyclohexene carboxaldehyde and 2.5-endomethylene cyclohexane carboxaldehyde which are easily obtained from cyclopentadiene and acrolein and, if necessary, subsequent hydrogenation, can be used as oxo compounds of the general Formula X.

If desired, alkyl and aralkyl radicals and also cycloalkyl radicals $R_3$ and/or $R_4$ can be introduced after ring closure by treating compounds of the general Formula I wherein $R_3$ and/or $R_4$ represent hydrogen, with alkylating or aralkylating agents or also with cycloalkylating agents such as methyl iodide, butyl bromide, allyl bromide, dimethyl or diethyl sulphate, benzyl chloride or benzyl bromide, the reaction being performed in the presence of acid binding agents.

Finally also compounds of the general formula:

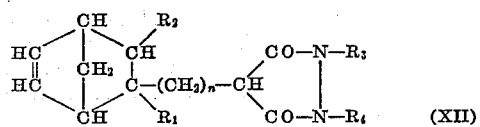

(XII)

which are obtained in a completely analogous manner to the compounds of the general Formula I by using derivatives of unsaturated bicyclically substituted malonic acid derivatives of the general formula:

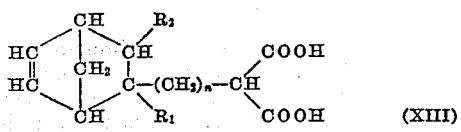

(XIII)

can be converted by means of catalytically activated hydrogen, e. g. by hydrogenation in the presence of noble metal catalysts or Raney nickel, into compounds of the general Formula I.

The new bicyclically substituted 3.5-dioxo-pyrazolidines easily dissolve both in the usual organic solvents as well as, probably in the tautameric enol form, in diluted aqueous alkalies. The new compounds also form salts with other inorganic as well as with organic bases.

The aqueous solutions of the alkali salts of the new compounds have also the additional property of being solubility promoters for pyrazole derivatives.

The following examples illustrate the production of the new compounds. The temperatures are given in degrees centigrade. Where not otherwise stated, parts are given as parts by weight and their relationship to parts by volume is as that of grammes to cubic centimetres.

Example 1

A sodium ethylate solution of 3.45 parts (1.5 mol) of sodium and 150 parts by volume of abs. ethanol is added dropwise at the boil within about 7 hours while stirring to a solution of 26.8 parts (1 mol) of 2.5-endomethylene-cyclohexylmethyl)malonic acid diethyl ester and 27.6 parts (1.5 mols) of hydrazobenzene in 300 parts by volume of abs. ethanol. Ethanol is simultaneously distilled off over a sloping condenser. The reaction mixture is kept for a further 2 hours at an oil bath temperature of 130°, allowed to stand for about 14 hours at room temperature and then it is taken up in 650 parts by volume of water. The aqueous alkaline solution is shaken several times with ether, then boiled out with animal charcoal, filtered and acidified with hydrochloric acid. The yellowish crude product which precipitates is recrystallised from methanol whereupon 1.2-diphenyl-4-(2'.5' - endomethylene-cyclohexylmethyl) - 3.5 - dioxo-pyrazolidine is obtained in the form of long colourless prisms which melt at 170–171°.

A particularly pure product is obtained in the following manner:

3.45 parts (1.5 gramme-atom) of sodium and 100 parts by volume of abs. methanol are added within one and a half hours to 26.8 parts (1 mol) of (2.5-endomethylene-cyclohexylmethyl)-malonic acid diethyl ester and 27.6 parts (1.5 mols) of hydrazobenzene in 50 parts by volume of abs. methanol. The solvent, which is distilled off by means of a sloping condenser, is continually replaced by, in all, 200 parts by volume of xylene. The reaction mixture is then kept for 6 hours at a bath temperature of between 140 and 160°. After working up as described above, 1.2 - diphenyl-4-(2'.5'-endomethylene-cyclohexylmethyl)-3.5-dioxo-pyrazolidine is obtained as a colourless product. The yield is 75–80% of the theoretical.

Example 2

12.45 parts (0.5 mol) of (2.5-endomethylene-cyclohexylmethyl)-malonyl chloride in 25 parts by volume of abs. ether and 12.1 parts (1 mol) of dimethylaniline in 25 parts by volume of abs. ether are added dropwise through two separate dropping funnels within about 1½ hours at about −5° while stirring, to a solution of 21.5 parts (1 mol) of p.p'-dimethyl hydrazobenzene in 150 parts by volume of abs. ether. The reaction mixture is stirred first for 4 hours at 0° and then for 4 hours at room temperature. Water is then added and the aqueous phase is extracted with ether and the extracts are combined with the ethereal phase. This is extracted with 1 N-caustic soda lye. On acidifying the alkaline extract, the crude 1.2 - bis - (p-methyl-phenyl) - 4 - (2'.5'-endomethylene-cyclohexylmethyl) - 3.5 - dioxo-pyrazolidine precipitates. Recrystallised from a great deal of methanol, it is obtained in the form of fine, pale yellowish needles which melt at 180–181°.

In an analogous manner, on using 15.2 parts of p.p'-dichlorohydrazobenzene (0.6 mol, i. e. slight excess), 1.2-bis - (p-chlorophenyl) - 4 - (2'.5' - endomethylene-cyclohexylmethyl)-3.5-dioxo-pyrazolidine is obtained which, after recrystallising from ethanol several times, melts at 205–207°; on using 20.5 parts (0.6 mol) of m.m'-dibromohydrazobenzene, 1.2-bis-(m-bromophenyl)-4-(2'.5'-endomethylene-cyclohexylmethyl)-3.5-dioxo-pyrazolidine is obtained which crystallises from methanol in fine, colourless needles which melt at 192–194°.

1 - phenyl - 2 - benzyl - 4 - (2.5 - endomethylene-cyclohexylmethyl)-3.5-dioxo-pyrazolidine (M. P. 88–90.5°) is obtained starting from 14 parts of N-phenyl-N'-benzyl hydrazine. Starting from N.N'-dibenzyl hydrazine, 1.2-dibenzyl - 4 - (2'.5' - endomethylene - cyclohexylmethyl)-3.5-dioxo-pyrazolidine is obtained as a colourless compound in an analogous manner. M. P. 96–97°.

On reacting (2.5-endomethylene-cyclohexyl)-malonic acid dichloride as described above with an equimolecular amount of hydrazobenzene or m.m'-dibromohydrazobenzene, in the presence of dimethyl aniline, 1.2-diphenyl-4-(2'.5'-endomethylene-cyclohexyl) - 3.5-dioxo-pyrazolidine (M. P. 159–161° recrystallised from ethanol) or 1.2-di-(m - bromophenyl) - 4 - (2'.5' - endomethylene - cyclohexyl)-3.5-dioxo-pyrazolidine (M. P. 143–145°) are obtained respectively.

Example 3

A sodium ethylate solution from 3.45 parts (1.5 mol) of sodium and 100 parts by volume of abs. ethanol is added dropwise in a nitrogen atmosphere while stirring at boiling temperature to a solution of 26.8 parts (1 mol) of (2.5-endomethylene-cyclohexylmethyl)-malonic acid diethyl ester and 16.2 parts (1.5 mol) of phenyl hydrazine in 300 parts by volume of abs. ethanol. The addition is made within 6 hours and ethanol is distilled off from the reaction mixture simultaneously. After heating for another hour at 110° (bath temperature), the reaction mixture is cooled, taken up in 600 parts by volume of water and undissolved particles are filtered off. The aqueous solution is shaken with ether and then the pH is adjusted to 3–4 with 5 N-hydrochloric acid. On standing for 10–20 hours, 1-phenyl-4-(2'.5'-endomethylene-cyclohexylmethyl)-3.5-dioxo-pyrazolidine precipitates as a pale yellowish amorphous product which, after recrystallising several times from methanol, melts at 178–179°.

On using 25.4 parts of (2.5-endomethylene-cyclohexyl)-malonic acid diethyl ester, 1-phenyl-4-(2'.5'-endomethylene-cyclohexyl)-3.5-dioxo-pyrazolidine (M. P. 156–157°) is obtained in an analogous manner.

Example 4

24.9 parts (1 mol) of (2.5-endomethylene-cyclohexylmethyl)-malonic acid dichloride in 120 parts by volume of abs. ether are added within about 1½ hours while stirring and cooling with a mixture of ice and sodium chloride to 13.8 parts (3 mols) of methyl hydrazine in 600 parts by volume of abs. ether. The reaction mixture is stirred for about another 4 hours in the melting cooling mixture and for a further 4 hours at room temperature. The ethereal reaction solution is then decanted from the precipitated salt, washed with water and then extracted 4 times with 40 parts by volume of 1 N-caustic soda lye each time. The alkaline extract is shaken with ether and brought to a pH 3 with hydrochloric acid. An oil then separates out. It is taken up in ether and, after evaporating off the solvent, is distilled in a high vacuum. The main fraction passes over at 174–183° under 0.1 mm. pressure and then partly crystallises. After recrystallisation from water and then from methanol, 1-methyl-4-(2'.5' - endomethylene - cyclohexylmethyl) - 3.5 - dioxo-pyrazolidine melts at 137–138°.

Some of the methyl hydrazine used to bind the hydrochloric acid can be regained from the substance which is insoluble in ether which precipitates during the reaction.

Starting from hydrazine or N.N'-dimethyl hydrazine, 4 - (2'.5' - endomethylene - cyclohexylmethyl) - 3.5-dioxo-pyrazolidine (M. P. 193° on decomposition) or 1.2 - dimethyl - 4 - (2'.5' - endomethylene - cyclohexylmethyl)-3.5-dioxo-pyrazolidine which passes over at 145–149° under 0.08 mm. pressure are obtained in an analogous manner. A product which melts at 161° on decomposition is obtained from the distillate by dissolving in caustic soda lye, precipitating and then recrystallising.

(2.5-endomethylene-cyclohexyl)-malonic acid dichloride can be reacted in a similar way with methyl hydrazine or with N.N'-dimethyl hydrazine. 1-methyl-4-(2'.5'-endomethylene-cyclohexyl)-3.5-dioxo-pyrazolidine (M. P. 164–166°) or 1.2-dimethyl-4-(2'.5'-endomethylene-cyclohexyl)-3.5-dioxo-pyrazolidine is obtained. The latter, like the homologue described above is isolated first as an oil. After distillation at 127–130° under 0.05 mm. pressure and recrystallisation, a product is obtained which melts at 85–87°.

Example 5

24.9 parts (1 mol) of (2.5-endomethylene-cyclohexylmethyl)-malonic acid dichloride in 400 parts by volume of abs. ether are added within about 1½ hours while stirring and cooling with a mixture of ice and sodium chloride to 36.6 parts (3 mols) of benzyl hydrazine in 800 parts by volume of abs. ether. The reaction mixture is then stirred for about 3 hours in the melting cooling mixture, then for an hour at room temperature and finally it is allowed to stand for some hours. It is then dissolved in ether and water, the ethereal phase is separated out, extracted six times with 80 parts by volume of 1 N-caustic soda lye each time. The alkaline extract is shaken with a little ether and then the pH is adjusted to 3 with hydrochloric acid. The greasy product which precipitates can be made to crystallise by rubbing with a little methanol. After further recrystallisation from methanol, 1-benzyl-4-(2'.5'-endomethylene-cyclohexylmethyl)-3.5-dioxo-pyrazolidine is obtained as fine, colourless clusters of needles which melt at 186–187°.

Example 6

22.1 parts of (2.4-endomethylene-cyclohexylmethyl)-cyanacetic acid ethyl ester and 10.8 parts of phenyl hydrazine are added to a sodium ethylate solution from 4.6 parts of sodium and 200 parts by volume of abs. ethanol, and the reaction mixture is refluxed for 14 hours. The ethanol is then evaporated off, finally in the vacuum, the residue is dissolved in 300 parts by volume of water and the aqueous solution is shaken with ether. The aqueous solution is then acidified with hydrochloric acid and the precipitated crude 1-phenyl-3-amino-4-(2'.5'-endomethylene cyclohexylmethyl)-5-pyrazolone is refluxed with 400 parts by volume of 2 N-hydrochloric acid for 20 hours. After cooling, the reaction product is taken up in ether, the ethereal solution is shaken with aqueous sodium bicarbonate solution and then extracted with 2 N-caustic soda lye. On acidifying the caustic soda lye extract with diluted hydrochloric acid, the crude 1-phenyl-4-(2'.5'-endomethylene-cyclohexylmethyl - 3.5 - dioxo - pyrazolidine which has already been described in Example 3 precipitates.

Example 7

28.4 parts of 1-phenyl-4-(2'.5'-endomethylene-cyclohexylmethyl)-3.5-dioxo-pyrazolidine obtained according to Example 3 in 200 parts by volume of 2 N-caustic soda lye are stirred at 15° with 20 parts of dimethyl sulphate. After one hour, the reaction mixture is filtered, the filtrate is shaken with ether and then acidified. The crude 1-phenyl - 2 - methyl - 4 - (2'.5'-endomethylene-cyclohexylmethyl)-3.5-dioxo-pyrazolidine which precipitates, is recrystallised from methanol.

Example 8

25.4 parts (1 mol) of (2.5-endomethylene-cyclohexylmethyl)-malonic acid ethyl ester chloride in 100 parts by volume of ether and 12.2 parts of dimethyl aniline in 50 parts by volume of abs. ether are added dropwise simultaneously from two separate dropping funnels within 30 minutes while stirring at —5° to a solution of 10.8 parts (1 mol) of phenyl hydrazine in 100 parts by volume of abs. ether. The reaction mixture is then stirred for 4 hours at 0° and then for 4 hours at room temperature. The precipitated dimethyl aniline hydrochloride is then drawn off under suction and the ethereal solution is evaporated off, finally in the vacuum.

The residue is put into a three-necked flask fitted with a stirrer, dropping funnel and sloping condenser. 400 parts by volume of abs. n-butanol are added and a sodium butylate solution from 4.6 parts of sodium and 300 parts by volume of abs. n-butanol is added, the volume of liquid being kept constant by simultaneously distilling off the butanol. On completion of the addition, the butanol is completely distilled off within 4 hours. The residue is dissolved in about 400 parts of water, the solution is shaken with ether, filtered over active charcoal until it is clear and then the pH is adjusted to about 3 with diluted hydrochloric acid. The 1-phenyl-4-(2'.5'-endomethylene - cyclohexylmethyl) - 3.5 - dioxo - pyrazolidine which precipitates is worked up as described in Example 3.

What we claim is:

1.2 -diphenyl - 4 - (2'.5' - endomethylene - cyclohexyl - methyl)-3.5-dioxo-pyrazolidine.

References Cited in the file of this patent

FOREIGN PATENTS

| | | |
|---|---|---|
| 506,892 | Belgium | Nov. 30, 1951 |
| 508,085 | Belgium | June 28, 1952 |